Jan. 5, 1937.　　　　O. MUELLER　　　　2,066,997
TAMPING IMPLEMENT
Filed June 18, 1935
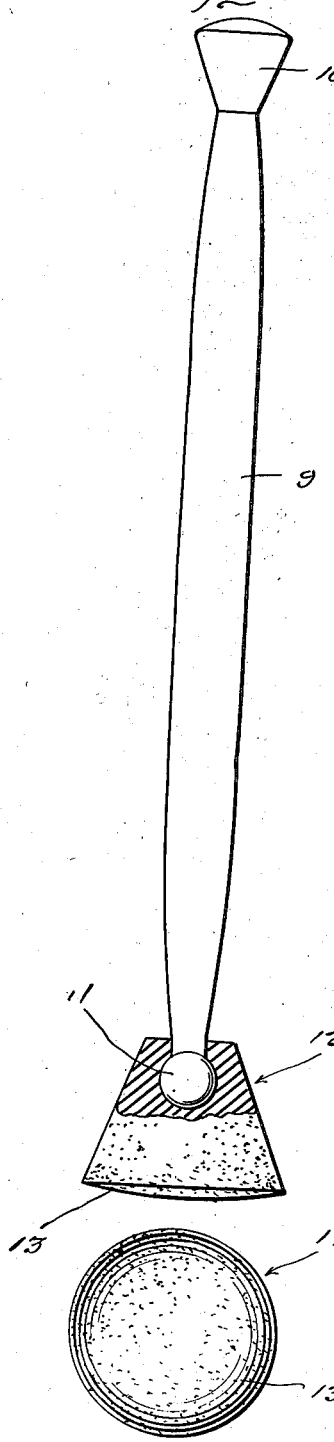
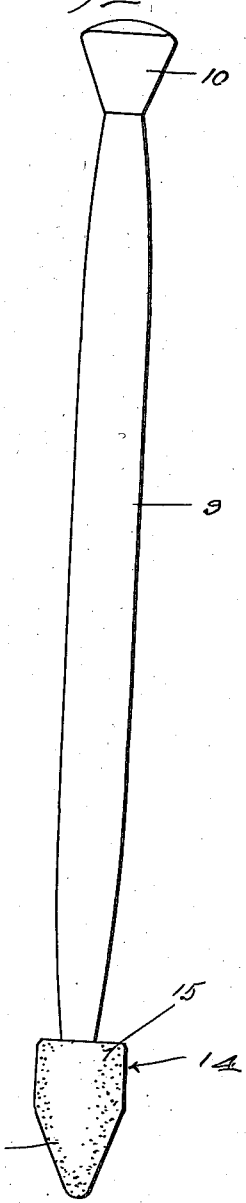
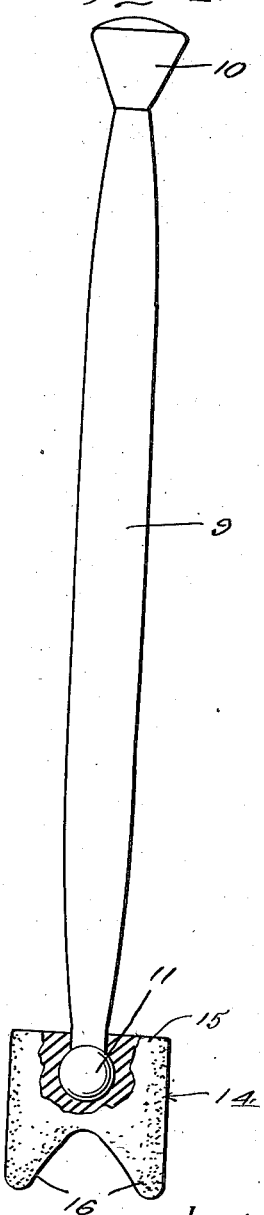
Fig. 1.　Fig. 3.　Fig. 4.
Fig. 2.
Inventor
Ottilie Mueller
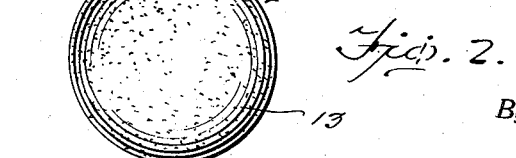
By Clarence A. O'Brien
Attorney Patented Jan. 5, 1937

2,066,997

UNITED STATES PATENT OFFICE 2,066,997

TAMPING IMPLEMENT

Ottilie Mueller, Wausau, Wis.

Application June 18, 1935, Serial No. 27,251

2 Claims. (Cl. 65—12)

This invention relates to novel tools and implements expressly designed for use in expediting the placement of fruits and vegetables in containers, the invention being most feasible and practicable in the canning industry.

By way of introduction it is to be pointed out that in reducing the inventive conception to practice I have evolved and produced an assortment or set of utility tools highly desirable for use in so-called cold packing work for canning fruits and vegetables in the home or elsewhere, the invention being more or less of an all-purpose nature and including a group of selectively usable tools will be described mainly in a plural sense. To facilitate handling this introductory portion of the descriptive matter, however, I will describe first a single tool since it is generically related to its companion or complemental tools.

In cold pack canning work, especially in the home, all sorts of makeshift instruments and devices are presumably used to expedite compactly arranging the edibles in the jars preparatory to closing for subsequent storage purposes. Without attempting to relate the disadvantages which flow from the employment of such means, I would point out that what I have discovered is an ingenious and efficient tool or implement which is aptly fitted for the purposes intended, susceptible of reliable and convenient manipulation, and otherwise in keeping with my ideas as to what is a dependable device to promote compact and neat packing.

Generically visualized and briefly stated, the preferred form of the tool comprises a suitably shaped and proportioned handle preferably made of wood but satisfactorily constructable from other non-corrosive materials, this handle being provided at the working end with a pliable rubber head whose shape varies according to the task at hand, said head, in all instances, being such as to lighten the physical efforts required for compact packing and to do this without mangling and hacking the contents of the container.

With the foregoing in mind, I will rely on the drawings and the succeeding descriptive matter to cover the idea both generically and specifically.

In the accompanying drawing wherein like numerals are employed to designate like parts throughout the views:

Figure 1 is an elevational view partly in section showing one embodiment of the implement or tool especially suitable for tamping and cold packing berries, green peas and beans, meats and sliced vegetables and fruits.

Figure 2 is a bottom plan view of the head portion of the aforesaid embodiment.

Figure 3 is an edge elevational view of a further embodiment showing a bifurcated or fork-type head especially suitable for placing string beans, greens and sliced edibles into the container.

Figure 4 is a view similar to Figure 1 showing the arrangement depicted in Figure 3 with portions in section.

Considering first the arrangement shown in Figures 1 and 2 it will be discerned that the handle, which is of wood, is denoted by the numeral 9 and is of appropriate shape and proportion. It is preferably provided at its upper end with a suitable knob 10 and formed on its lower tapered end with a ball-like jointing head 11 susceptible of being adequately anchored or molded in the rubber tamping head 12. This particular style of head is of general frusto-conical form and provided with a convex base or bottom portion 13. This head is of pliable rubber of a predetermined texture. The rubber should be sufficiently durable to facilitate boiling and scalding it in hot water for cleansing purposes. At the same time it must be sufficiently pliable to permit it to operate in the desired plunger-like manner needed for compactly packing the contents of the jar. The slightly curved or convex bottom 13 is aptly fitted, it is believed, to permit the head to be utilized to advantage in packing meat. At the same time it is equally well adapted for firmly pressing and packing berries, peas, greens and sliced vegetables and fruits into a jar.

Before proceeding with the other form of the invention, I might say that the same type of a handle is used throughout. Under the circumstances, the features of the handle are designated throughout the views by the numerals 9, 10 and 11.

Referring now to Figures 3 and 4 it will be observed that the distinction here resides in the particular construction of the soft rubber or pliable tamping and packing head 14. This may be said to include a substantially rectangular body or shank 15 adaptable for connection of the ball jointing head 11 thereto. In addition the furcations 16 are in effect blunt prongs and form between themselves a V-shaped crotch. This tapered blunt end construction permits the furcations to function as exaggerated tines or fingers susceptible of straddling sliced pieces to expedite maneuvering them into orderly shape for compact pressing and packing. It will be evident, therefore, that the type of head shown in Figure 1 is suitable for certain kinds of work while that indicated at 14 and shown in Figures 3 and 4 is more aptly fitted for other and more tedious tasks. In either instance, however, this head (made of rubber or other suitable equivalent material) serving as a tamping and plunger element, will lighten the physical effort ordinarily unwisely expended to the end that it will alleviate special painstaking endeavors usually resorted to but now avoided through the use of this type of tool.

Collectively considered the embodiments of the implements or tools heretofore described provide an adequate means to facilitate compact packing fruits, vegetables and meats in the so-called cold-pack canning lines. Although the assortment or set of tools possess greater utility if used individually as an ensemble, it is evident that the tools are susceptible of individual use for general canning work. The gist of the invention is therefore predicated upon the adoption and use of a simple economical well-balanced plunger-like tool or implement characterized by a non-corrosive lightweight handle properly designed for the work in hand, said handle having a pliable rubber tamping head at the working end, and said head being fashioned to conform to the articles being handled, whereby to provide a device such as may be unqualifiedly endorsed for the tedious tasks heretofore enumerated.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice, if desired.

Having thus described the invention, what is claimed as new is:

1. A tamping tool for cold pack canning work comprising a working handle, a manipulating head carried by the operating end of said handle and comprising a substantially rectangular body, the adjacent end of said handle being embedded therein, the lower portion of said body being bifurcated to define a substantially V-shaped crotch and associated furcations, said furcations being of generally rounded in cross-sectional form and longitudinally tapered to function as positioning, arranging, pressing and packing prongs and the extremities thereof being blunt and rounded in the manner and for the purposes described.

2. As a new article of manufacture and as a component part of a tamping implement of the class described, a tamping head including a body portion fashioned to permit it to be attached to an operating handle in a manner to be conveniently manipulated in a fruit jar or the like, the working end of said head being provided with a pair of spaced duplicate prongs and said prongs being generally rounded in cross-sectional form and longitudinally tapered to function as positioning, arranging and packing elements and the extremities thereof being of blunt formation.

OTTILIE MUELLER.